US012715189B2

(12) United States Patent
Regoli et al.

(10) Patent No.: US 12,715,189 B2
(45) Date of Patent: Aug. 25, 2026

(54) METHOD AND APPARATUS FOR CHECKING TYRES

(71) Applicant: PIRELLI TYRE S.P.A., Milan (IT)

(72) Inventors: Fabio Regoli, Milan (IT); Davide Abramo Conti, Milan (IT); Stefano Monti, Milan (IT); Alessandro Held, Milan (IT); Lorenzo Roberti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 43 days.

(21) Appl. No.: 18/713,117

(22) PCT Filed: Dec. 16, 2022

(86) PCT No.: PCT/IB2022/062348
§ 371 (c)(1),
(2) Date: May 23, 2024

(87) PCT Pub. No.: WO2023/119086
PCT Pub. Date: Jun. 29, 2023

(65) Prior Publication Data

US 2025/0018671 A1 Jan. 16, 2025

(30) Foreign Application Priority Data

Dec. 23, 2021 (IT) .................... IT102021000032345

(51) Int. Cl.
*G06V 30/422* (2022.01)
*B29D 30/00* (2006.01)
(Continued)

(52) U.S. Cl.
CPC .......... *B29D 30/0061* (2013.01); *G06T 7/001* (2013.01); *G06T 11/00* (2013.01);
(Continued)

(58) Field of Classification Search
CPC ........ B29D 30/0061; B29D 2030/0066; G06V 30/422; G06V 30/19013; G06T 7/001; G06T 11/00; G06K 7/1443
See application file for complete search history.

(56) References Cited

U.S. PATENT DOCUMENTS 10,438,036 B1 * 10/2019 Reome ................ G06K 7/1404
11,935,222 B2 * 3/2024 Bogomolny ......... G01N 21/952
(Continued)

FOREIGN PATENT DOCUMENTS

DE 202005000640 U1 5/2005
DE 102008023936 A1 8/2009
(Continued)

OTHER PUBLICATIONS

European Office Action issued for European Application No. 22838958.1 filed on Jan. 28, 2025 on behalf of Pirelli Tyre S.P.A. Mail Date: Oct. 23, 2025. 7 pages.
(Continued)

*Primary Examiner* — Yu Chen
(74) *Attorney, Agent, or Firm* — Steinfl + Bruno LLP

(57) ABSTRACT

A method for checking tyres includes: arranging, at a checking device, a finished tyre that was moulded in a mould, and providing comparison data inclusive of a drawing of the mould and supplementary data. The method also includes: activating one or more detection devices to obtain a graphic representation of at least one sidewall of the finished tyre; activating a processing unit to perform a comparison between symbols included in the graphic representation and symbols defined by the comparison data; and generating, by the processing unit, a notification signal representative of a result of the comparison. A tyre checking apparatus is also described.

13 Claims, 6 Drawing Sheets

Figure 1:
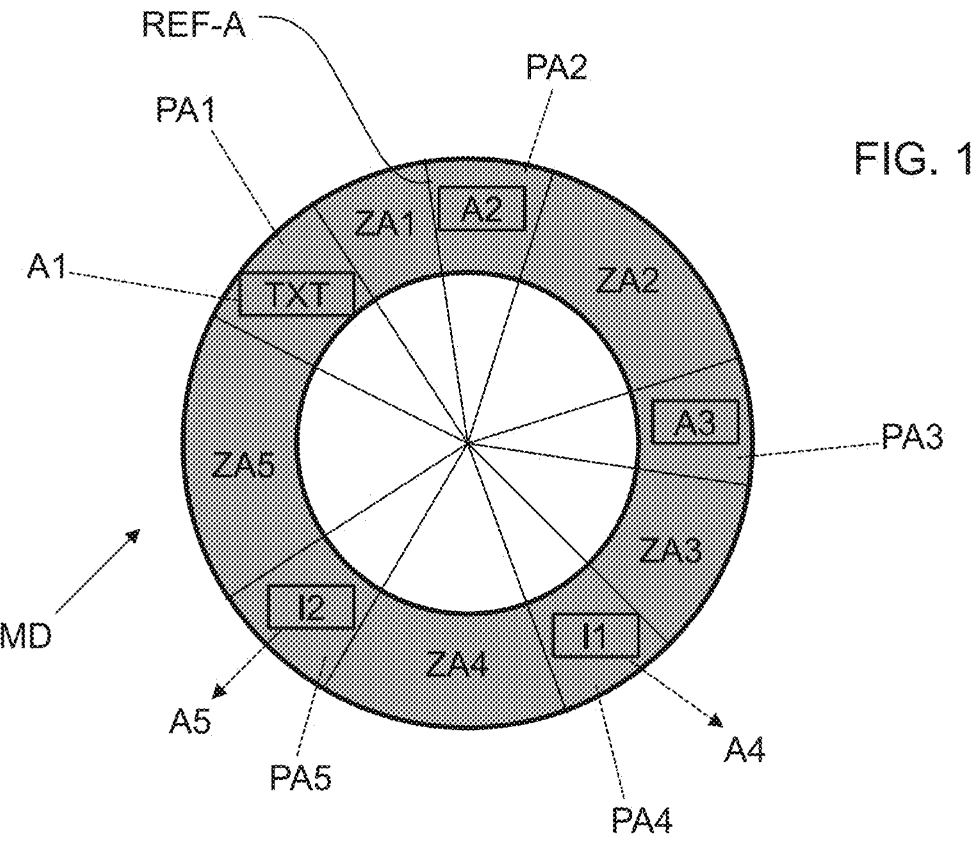

(51) Int. Cl.

| | |
|---|---|
| ***G06T 7/00*** | (2017.01) |
| ***G06T 11/00*** | (2006.01) |
| ***G06V 30/19*** | (2022.01) |
| *G06K 7/14* | (2006.01) |

(52) U.S. Cl.
CPC ...... *G06V 30/19013* (2022.01); *G06V 30/422* (2022.01); *B29D 2030/0066* (2013.01); *G06K 7/1443* (2013.01)

(56) References Cited

U.S. PATENT DOCUMENTS

| | | | | |
|---|---|---|---|---|
| 12,188,845 | B1* | 1/2025 | Voeller | H04N 9/646 |
| 2011/0013823 | A1* | 1/2011 | Joly | G01M 17/027 382/141 |
| 2013/0266225 | A1* | 10/2013 | Vinciguerra | G06T 3/10 382/190 |
| 2016/0263952 | A1* | 9/2016 | Mizutani | G06V 10/7515 |
| 2018/0197285 | A1* | 7/2018 | Vinciguerra | G06T 7/001 |
| 2018/0328819 | A1* | 11/2018 | Boffa | G01M 17/027 |
| 2019/0340750 | A1* | 11/2019 | Ren | B29D 30/0662 |
| 2022/0058417 | A1* | 2/2022 | Kazmi | G06N 3/08 |

FOREIGN PATENT DOCUMENTS

| | | | |
|---|---|---|---|
| EP | 3059545 | A1 | 8/2016 |
| KR | 102316307 | B1 | 10/2021 |
| WO | 2015/097635 | A1 | 7/2015 |
| WO | 2016/174543 | A1 | 11/2016 |

OTHER PUBLICATIONS

International Search Report and Written Opinion issued for International PCT Application No. PCT/IB2022/062348 filed on Dec. 16, 2022 on behalf of Pirelli Tyre S.P.A. Mail Date: Mar. 22, 2023. 14 pages.

Italian Search Report issued for Italian Application No. 102021000032345 filed on Dec. 23, 2021 on behalf of Pirelli Tyre S.P.A. Mail Date: Sep. 8, 2022. 10 pages (Original and English translation).

* cited by examiner

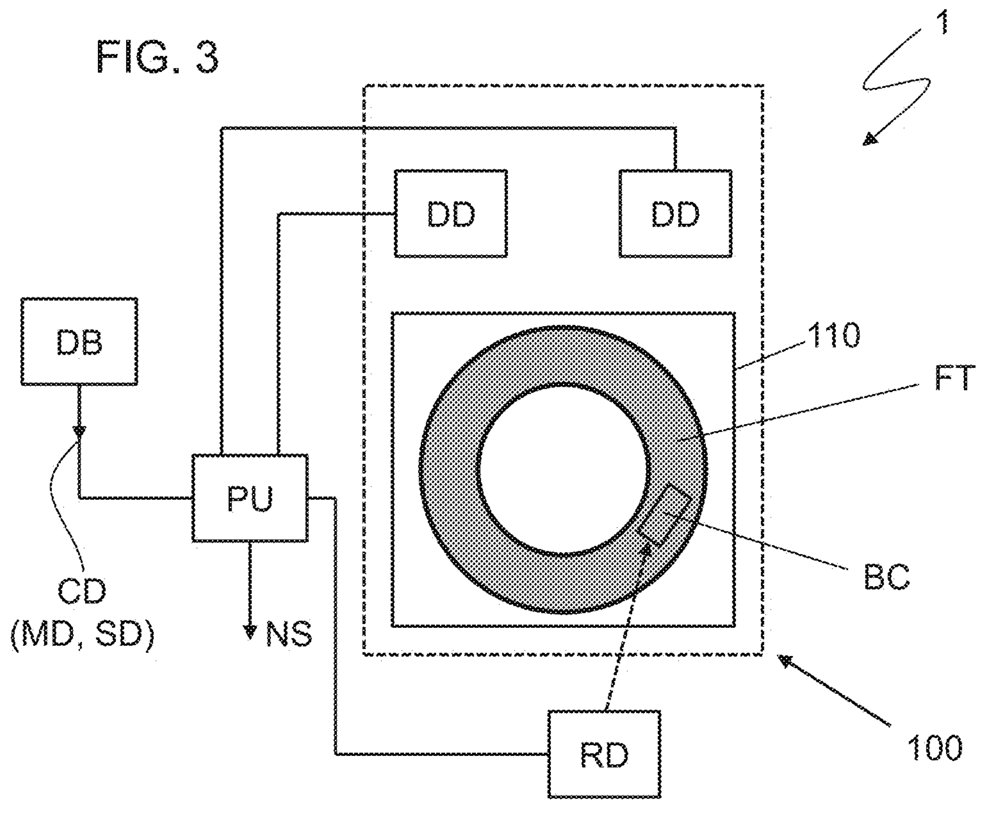
FIG. 6a
FIG. 6b

METHOD AND APPARATUS FOR CHECKING TYRES

CROSS REFERENCE TO RELATED APPLICATIONS

The present application is the U.S. national stage of International Application No. PCT/IB2022/062348 filed on Dec. 16, 2022, which, in turn, claims priority to Italian Patent Application No. 102021000032345 filed on Dec. 23, 2021.

The present invention relates to a method for checking tyres.

The present invention further relates to a tyre checking apparatus.

A tyre for vehicle wheels generally comprises a carcass structure including at least one carcass ply having respectively opposite end flaps in engagement with respective annular anchoring structures, generally referred to as "bead cores", integrated into the regions usually identified as "beads", the inside diameter of which substantially matches a so-called "fitting diameter" of the tyre for fitting it onto a respective rim. The tyre also comprises a crown structure including at least one belt band located in a radially external position relative to the carcass ply, and a tread band which is radially external to the belt band. Between the tread band and the belt band(s) a so-called "underlayer" of elastomeric material may be interposed, the properties of which are suitable for providing a stable union between the belt band(s) and the tread band. In addition, respective sidewalls of elastomeric material are applied to the side surfaces of the carcass structure, each extending from one of the side edges of the tread band up to the respective annular bead anchoring structure. In tyres of the "tubeless" type, the carcass ply is internally coated with a layer of elastomeric material, preferably a butyl-based one, commonly referred to as "liner", which has optimal air tightness properties and extends from one bead to the other.

The term "elastomeric material" refers to a compound comprising at least one elastomeric polymer and at least one reinforcing charge. Preferably, said compound also comprises additives such as, for example, a cross-linking agent and/or a plasticizer. Thanks to the presence of the cross-linking agent, said material can be cross-linked by heating to form the final product.

A "component" or "structural component" of a tyre is meant to be any portion of the latter which can perform a specific function, or a part thereof. Structural tyre components include, for example: liner, underliner, sidewall inserts, bead cores, filler inserts, anti-abrasive layer, sidewalls, carcass ply(ies), belt layer(s), tread band, tread band underlayer, underbelt inserts, etc., or a part thereof.

A "tyre being processed" is a tyre that has not yet completed the building process, i.e. in which the structural components have not all been assembled together yet, and/or which has not yet undergone all the checks and/or operations required prior to the moulding and curing processes.

The expression "building process" includes all operations for manufacturing, checking and verifying the tyre being processed prior to moulding and curing.

A "green tyre" is a tyre which has completed the building process, but has not yet undergone the moulding and curing process.

A "finished tyre" is a tyre which has been subjected to the moulding and curing process.

A "symbol" is meant to be a shape given to a portion of the surface of a sidewall of a finished tyre in order to lend such portion some informative content. By way of example, a symbol may comprise one or more writings, one or more logos, one or more graphic elements, etc. applied to a sidewall of a finished tyre.

A "mould drawing" is meant to be a graphics file representative of the shape and dimensions of the mould. The mould drawing may be a graphics file containing the mould design in its final version, which is used for producing the mould, e.g. a CAD (Computer Aided Design) graphics file.

The "supplementary data" of a finished tyre are data which are expected to appear on said finished tyre although they are not included in the mould drawing.

The moulding and curing process has a dual purpose of giving the tyre its final mechanical/structural characteristics and forming a series of symbols on the tyre sidewalls.

Such symbols may represent technical and/or commercial information, such as, for example: manufacturer's name/logo, size, tyre type, intended season, possible certifications, etc.

Typically, the verification of the correct presence of the symbols is entrusted to a human operator, who is given a checklist listing, one by one, all the symbols that should be present on the sidewalls of a given tyre. The operator visually verifies that the items on the checklist match those on the tyre under examination.

Document KR 102316307 B1 describes a device for detecting sidewalls prints and defects of a tyre; such device comprises, among other features: a text pattern checking unit, configured for checking a text pattern on the tyre and determining if the text pattern corresponds to pre-stored text pattern information; a three-dimensional image generation unit, configured for generating a three-dimensional image of the tyre while the text pattern checking unit is determining if the text pattern corresponds to pre-stored text pattern information; a tread pattern checking unit, configured for determining if a tread pattern depth value of the tyre in the stereoscopic image corresponds to pre-stored tread pattern information; a tyre defect checking unit, configured for detecting a defect of the tyre based on a result obtained by the text pattern checking unit and the tread pattern checking unit. More in particular, document KR 102316307 B1 requires the tyre to be installed on a vehicle and inflated prior to being checked.

The Applicant has verified that manual checks may not prove fully effective and require non-negligible execution times.

In particular, the Applicant observes that these verifications are carried out, for example, on the first moulded and cured tyre after the installation of a new mould (that is, for example, a mould which is different from the previous one) in a curing apparatus. Should any error/dissimilarity be detected, this will prevent moulding a whole series of unfit tyres. However, this means that, until the check on the first tyre is complete, the curing apparatus will remain idle. In short, the longer the time necessary for checking the first tyre, the less efficient the curing apparatus will be from a production viewpoint.

The Applicant also felt the need for developing a technique for checking symbols on finished tyres which could be applied to production lines and which could improve the reliability and rapidity of the verifications.

The Applicant observes that the symbols that are present on the sidewalls of a finished tyre are formed by the mould installed in the curing apparatus in use.

The Applicant also observes that a mould drawing is typically available, preferably as a graphics file (e.g. a CAD—Computer Aided Design—file), which is used for making the mould; the mould drawing can therefore be used as a term of comparison for verifying symbols on a tyre, since the symbols that are present on the mould must then be found on the tyre sidewall.

Therefore, the Applicant perceived that a comparison useful for effectively verifying the symbols on the sidewalls of a tyre can be made between the mould drawing and a graphic representation of a finished tyre.

As perceived by the Applicant, such verification should be made automatically, so that effective and repeatable checks can be carried out in acceptable times for a production line.

The Applicant has therefore found that, by acquiring a graphic representation of at least one sidewall of a finished tyre and inputting such graphic representation to a processing unit along with a mould drawing used for moulding said finished tyre, it is possible to make a reliable comparison which is compatible—as far as time is concerned—with production-line applications.

In accordance with a first aspect, the invention relates to a method for checking tyres.

Preferably, a finished tyre is arranged at a checking device.

Preferably, said finished tyre was moulded and cured in a mould.

Preferably, comparison data are provided.

Preferably, said comparison data comprise a drawing of said mould.

Preferably, one or more detection devices are activated in order to obtain a graphic representation of at least one sidewall of said finished tyre.

Preferably, a processing unit is activated in order to make a comparison between symbols included in said graphic representation and symbols defined by said comparison data.

Preferably, a notification signal is generated which is representative of a result of said comparison.

Preferably, said notification signal is generated by means of said processing unit.

The Applicant believes that this permits an accurate and sufficiently fast verification of the symbols that are present on a finished tyre. More specifically, the time necessary for checking the tyre is drastically reduced in comparison with prior-art manual methods; in fact, the Applicant estimated that the invention allows completing the required checks in about 5 minutes, as opposed to 30-60 minutes as is the case today.

The Applicant also believes that this method ensures a precise and repeatable detection of details that are substantially imperceptible by the human eye, although they may have a commercial impact.

Finally, the Applicant believes that the automation proposed by the present invention ensures full tracking of the collected results.

In accordance with a further aspect, the invention relates to a tyre checking apparatus.

Preferably, a checking device is employed.

Preferably, said checking device is provided with a support for a finished tyre.

Preferably, said finished tyre was moulded and cured in a mould.

Preferably, said checking device is provided with one or more detection devices.

Preferably, said one or more detection devices are operatively associated with said support.

Preferably, said apparatus comprises a processing unit.

Preferably, said processing unit is configured for obtaining a graphic representation of at least one sidewall of said finished tyre.

Preferably, said graphic representation is obtained by means of said one or more detection devices.

Preferably, said processing unit is configured for acquiring comparison data.

Preferably, said comparison data comprise a drawing of said mould.

Preferably, said processing unit is configured for making a comparison between symbols included in said graphic representation and symbols defined by said comparison data.

Preferably, said processing unit is configured for generating a notification signal.

Preferably, said notification signal is representative of a result of said comparison.

Under at least one of the above aspects, the present invention may have at least one of the following preferable features.

Preferably, said comparison data comprise supplementary data.

The Applicant has verified, in fact, that some symbols are present on the mould which may be subjected to modifications/updates in the course of the life of the mould, without the mould drawing being modified/updated accordingly, or which are not specified in the mould drawing at all. For example, it may occur that the following information is not included in the mould drawing or is modified at a later time: tyre production time reference (included in the DOT code); mould serial number; QR code (containing various bits of information about the tyre); version of the profile of the sidewall plates (i.e. those mould portions which are in contact with the tyre sidewalls). The Applicant observes that in some cases a complete verification requires supplementary data providing the information not included in the mould drawing. The Applicant also observes that such information not included in the mould drawing can be retrieved from company computer systems, because the data about each curing apparatus and each tyre are always tracked and stored.

Furthermore, this makes it possible to accurately verify that no symbols are present in addition to those actually required; this check is extremely difficult to make for a human operator, and sometimes lacks precision.

Preferably, said finished tyre is the first finished tyre obtained from said mould after the installation of said mould in a respective curing apparatus.

Preferably, providing said comparison data comprises detecting a code on said finished tyre. More preferably, providing said comparison data comprises detecting a code on a sidewall of said finished tyre.

Preferably, providing said comparison data comprises selecting said comparison data in a database.

Preferably, said comparison data are selected on the basis of said code.

Preferably, detecting said code comprises taking a first reading of said code.

Preferably, said first reading is taken before said finished tyre is arranged at said checking device.

Preferably, detecting said code comprises taking a second reading of said code.

a. Preferably, said second reading is taken after said finished tyre has been arranged at said checking device.

Preferably, detecting said code comprises comparing a result of said first reading with a result of said second reading.

Preferably, said supplementary data comprise a tyre production time reference.

Preferably, said supplementary data comprise a mould serial number.

Preferably, said supplementary data comprise an information code.

Preferably, said supplementary data comprise a version of a profile of sidewall plates belonging to said mould.

Preferably, in order to obtain said graphic representation, one or more compensation algorithms are applied to compensate for deformations of said finished tyre.

Preferably, said comparison between symbols included in said graphic representation and symbols defined by said comparison data comprises identifying symbols included in the mould drawing.

Preferably, said comparison between symbols included in said graphic representation and symbols defined by said comparison data comprises searching for and identifying corresponding symbols included in the graphic representation.

Preferably, said comparison between symbols included in said graphic representation and symbols defined by said comparison data comprises comparing each symbol included in the mould drawing with the corresponding symbol in the graphic representation.

Preferably, said comparison between each symbol included in the mould drawing and the corresponding symbol in the graphic representation comprises comparing the position of each symbol included in the mould drawing with the position of the corresponding symbol in the graphic representation.

Preferably, said comparison between each symbol included in the mould drawing and the corresponding symbol in the graphic representation comprises comparing the shape of each symbol included in the mould drawing with the shape of the corresponding symbol in the graphic representation.

Preferably, at least one symbol included in the mould drawing comprises a text portion.

Preferably, the comparison between said at least one symbol comprising a text portion and the corresponding symbol in the graphic representation comprises selecting the text portion included in the mould drawing.

Preferably, the comparison between said at least one symbol comprising a text portion and the corresponding symbol in the graphic representation comprises executing an OCR operation on the corresponding symbol in the graphic representation, thereby obtaining an alphanumeric result.

Preferably, the comparison between said at least one symbol comprising a text portion and the corresponding symbol in the graphic representation comprises comparing the text portion included in the mould drawing with said alphanumeric result.

Preferably, making the comparison between symbols included in said graphic representation and symbols defined by said comparison data comprises comparing said supplementary data with symbols included in the graphic representation.

Preferably, the comparison between said supplementary data and symbols included in the graphic representation comprises identifying a first indication in the mould drawing.

Preferably, the first indication is representative of a symbol that is absent in said mould drawing, but expected on the finished tyre.

Preferably, the comparison between said supplementary data and symbols included in the graphic representation comprises locating text data in said supplementary data.

Preferably, said text data are representative of said symbol that is absent in said mould drawing, but expected on the finished tyre, corresponding to said first indication.

Preferably, said comparison between said supplementary data and symbols included in the graphic representation comprises locating, in the drawing of said mould, a first portion where said first indication is situated.

Preferably, said comparison between said supplementary data and symbols included in the graphic representation comprises subjecting a second portion of said graphic representation, corresponding to the first portion of the drawing of said mould, to OCR scanning.

Preferably, said OCR scanning detects a symbol consisting of text data.

Preferably, said comparison between said supplementary data and symbols included in the graphic representation comprises comparing, by OCR scanning, text data describing the symbol that is absent in the mould drawing, but expected on the finished tyre, with the text data of the symbol detected in the graphic representation.

Preferably, said comparison between said supplementary data and symbols included in the graphic representation comprises locating, in the drawing of said mould, a second indication.

Preferably, the second indication is representative of a symbol consisting of a QR code that is absent in said mould drawing, but expected on the finished tyre.

Preferably, said comparison between said supplementary data and symbols included in the graphic representation comprises identifying, in the drawing of said mould, a third portion where said second indication is situated.

Preferably, the comparison between said supplementary data and symbols included in the graphic representation comprises locating, among said supplementary data, data represented by said QR code.

Preferably, said comparison between said supplementary data and symbols included in the graphic representation comprises detecting in said graphic representation, in a fourth portion corresponding to the third portion of the mould drawing, a QR code.

Preferably, said comparison between said supplementary data and symbols included in the graphic representation comprises decoding said detected QR code, thereby obtaining a corresponding alphanumeric string.

Preferably, said comparison between said supplementary data and symbols included in the graphic representation comprises comparing the data represented by said QR code, located in said supplementary data, with said corresponding alphanumeric string.

Preferably, comparing the graphic representation with the comparison data comprises verifying if the graphic representation includes any further symbols other than the symbols defined by the comparison data.

Preferably, said verification comprises locating zones in the mould drawing where no symbols or indications of symbols are present.

Preferably, said verification comprises verifying if there are any symbols in corresponding zones of the graphic representation.

Preferably, said checking device comprises a centring device for positioning said finished tyre.

Preferably, a reading device is employed.

Preferably, said reading device is configured for reading a code affixed to said finished tyre. More preferably, said reading device is configured for reading a code affixed to a sidewall of said finished tyre.

Preferably, said processing unit is configured for acquiring said comparison data as a function of the reading of said code.

Preferably, said checking device comprises a frame.

Preferably, said checking device comprises driving members for moving said one or more detection devices relative to said frame.

Figure 2:
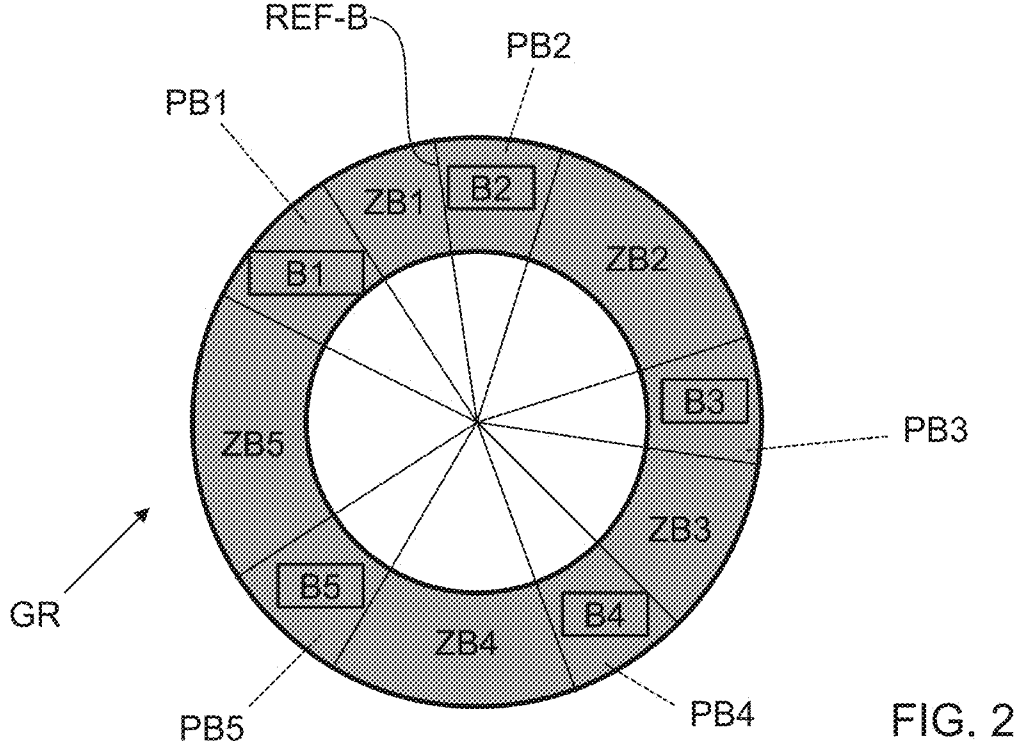
Figure 4:
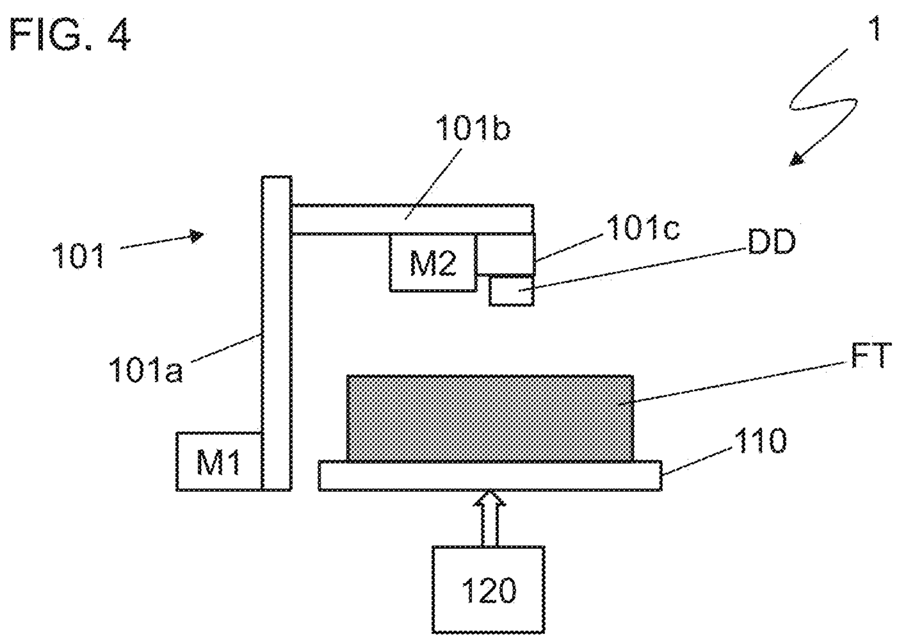
Figure 5:
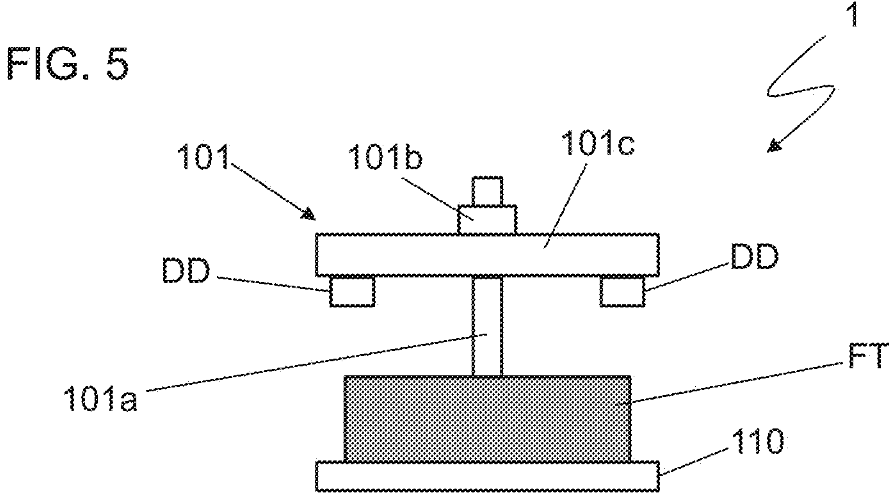
Figure 7:
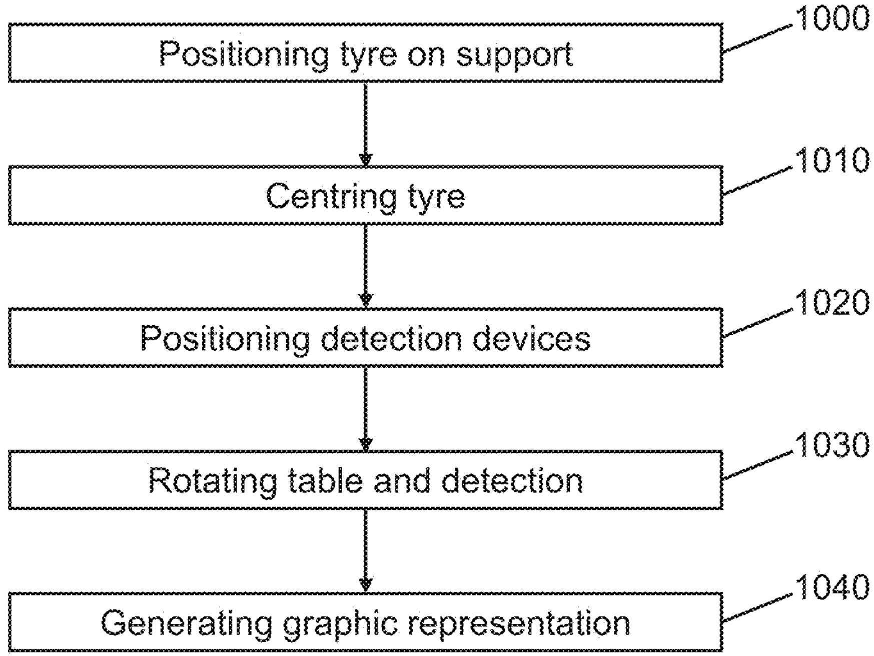
Figure 8:
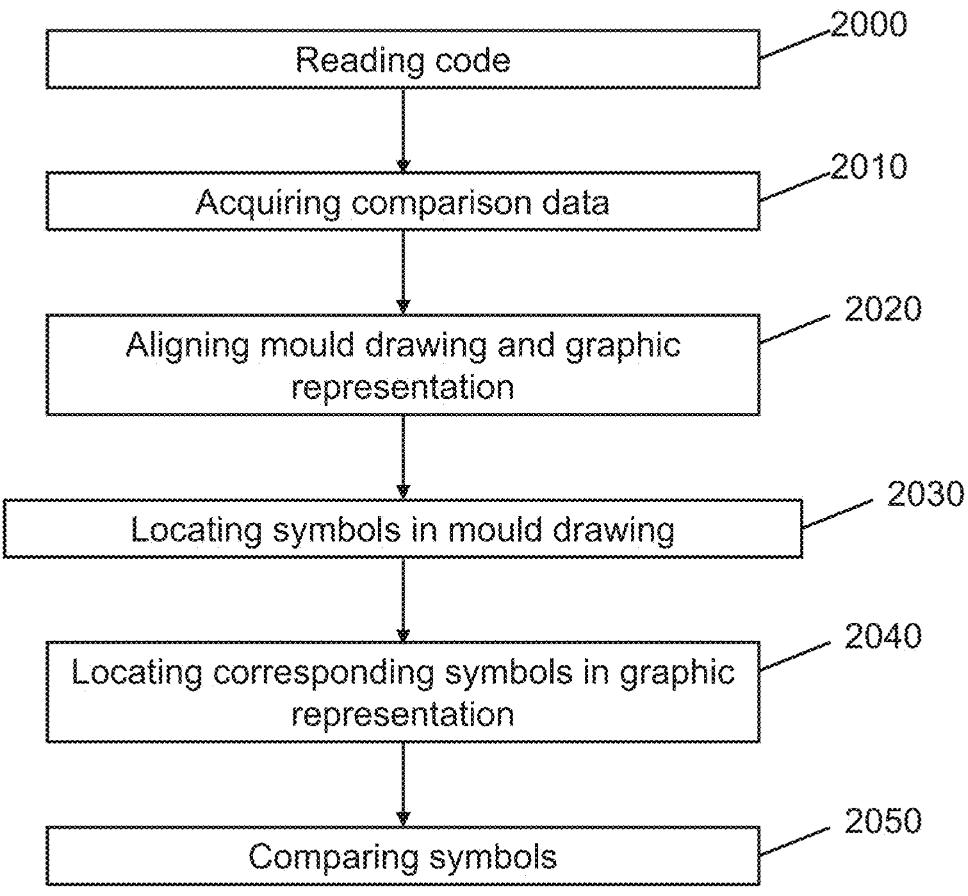
Figure 9:
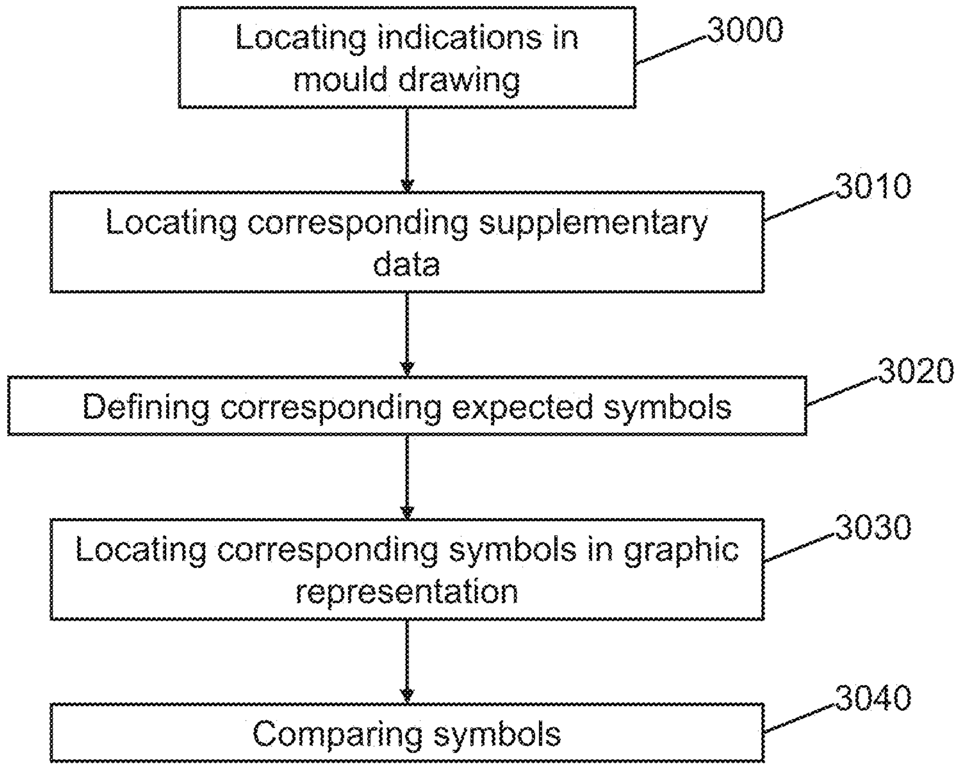

Further features and advantages will become more apparent in the light of the following detailed description of a preferred, but non-limiting, embodiment of the invention. Such description is provided herein with reference to the annexed drawings, which are also supplied by way of non-limiting example, wherein:

FIG. 1 schematically shows a mould drawing used in the present invention;

FIG. 2 schematically shows a graphic representation of a finished tyre obtained through the execution of operations envisaged by the present invention;

FIGS. 3-5 schematically show an apparatus according to the present invention;

FIGS. 6*a*-6*b* show some examples of detections carried out as envisaged by the present invention;

FIGS. 7-9 are flow charts representing operations carried out in accordance with the present invention.

With reference to the appended figures, numeral 1 designates as a whole a tyre checking apparatus in accordance with the present invention.

The apparatus 1 (FIGS. 3-5) comprises a checking device 100.

The checking device 100 comprises, in turn, a support 110 for a finished tyre FT, and one or more detection devices DD.

The support 110 may comprise, for example, a rotary table, whereon the finished tyre FT can be laid, having a substantially horizontal (i.e. parallel to the ground) axial centre plane.

The rotary table is coupled to suitable driving devices (not shown), which cause the table to rotate about a vertical axis.

The checking device 100 further comprises a centring device 120 for positioning the finished tyre FT. In particular, the centring device 120 operates in such a way as to cause the axis of rotation of the finished tyre FT to coincide with the vertical axis about which the rotary table turns.

An example of a support and a centring device is provided in document WO 2016/174543 by the present Applicant.

The above-mentioned one or more detection devices DD may comprise one or more cameras and/or one or more laser detectors.

As will become more apparent below, the detection devices DD are used in order to obtain a graphic representation of the finished tyre FT positioned on the support 110.

More particularly, the checking device 100 includes a frame 101 (FIGS. 4-5), which comprises an upright 101*a*, a first crossmember 101*b* and a second crossmember 101*c*.

Preferably, the first crossmember 101*b* is substantially horizontal and extends perpendicularly from the upright 101*a*.

Preferably, the second crossmember 101*c* is supported by the first crossmember 101*a* on the side opposite the upright 101*a*.

Preferably, the second crossmember 101*c* is substantially horizontal, in particular substantially perpendicular to the first crossmember 101*b*.

Preferably, the second crossmember 101*c* is supported by the first crossmember 101*b* at a substantially intermediate point of the second crossmember 101*c*.

Preferably, the detection devices DD are mounted on the second crossmember 101*c*.

Advantageously, the checking device 100 comprises driving members M1, M2 for moving the detection devices DD relative to the frame 101 and/or relative to the support 110.

A first driving member M1 may be used to cause a vertical movement of the detection devices DD.

For example, the first driving member M1 causes the first crossmember 101*b* to move vertically along the upright 101*a*.

The first driving member M1 may be implemented, for example, as an electric motor. In one embodiment, such electric motor may be integrally connected to the first crossmember 101*b*. In another embodiment, such electric motor may be integrally connected to the upright 101*a* and transfer the motion to the first crossmember 101*b* via a suitable kinematic mechanism.

A second driving member M2 may be used to cause a horizontal movement of the detection devices DD.

For example, the second driving member M2 causes the second crossmember 101*c* to move horizontally relative to the first crossmember 101*b*, along the first crossmember 101*b* itself.

The second driving member M2 may be implemented, for example, as an electric motor. In one embodiment, such electric motor may be integrally connected to the second crossmember 101*c*. In another embodiment, such electric motor may be integrally connected to the first crossmember 101*b* and transfer the motion to the second crossmember 101*c* via a suitable kinematic mechanism.

The checking apparatus 1 further comprises a processing unit PU.

The processing unit PU is configured for generating, based on the detections made by the detection devices DD, a graphic representation GR of at least one sidewall of the finished tyre FT.

As will become more apparent below, the processing unit PU verifies the symbols that are present on the sidewall of the finished tyre FT and generates a notification signal NS as a result of such verification.

In practical terms, the notification signal NS indicates if all and only the required symbols are present on the sidewall of the finished tyre FT, and if such symbols have the required quality and precision.

In more detail, the finished tyre FT is brought in proximity to the checking device 100; prior to positioning the finished tyre FT on the support 110, a first reading is taken of a code BC that is present on at least one sidewall of the tyre FT. Such code BC is, for example, a bar code.

Based on the code BC, some information is retrieved from a database DB, such as, for example, the size of the finished tyre FT, an identification code (the so-called "ipcode"), etc.

According to the size thus obtained, the finished tyre FT is then automatically positioned and centred in the checking device 100.

In particular, the finished tyre is manually arranged on the support 110 (block 1000 in FIG. 7).

In a per se known manner, the finished tyre FT is properly positioned by means of the centring device 120, so that it can be rotated about its own axis (block 1010 in FIG. 7).

By means of the driving members M1, M2, the detection devices DD are positioned (block 1020 in FIG. 7) in such a way as to be able to appropriately detect the shape of the sidewall of the finished tyre FT.

In one embodiment, the driving members M1, M2 are actuated as a function of the size of the finished tyre FT (retrieved by using the code BC). Therefore, the position of the detection devices DD is determined in accordance with the size of the finished tyre FT.

Prior to activating the detection devices DD, the code BC of the finished tyre FT is preferably checked again.

In other words, a first reading of the code BC is taken before the finished tyre FT is arranged at the checking device 100 (i.e. before the finished tyre is laid on the support 110). Subsequently, once the finished tyre FT has been arranged at the checking device 100 (i.e. laid on the support 110), a second reading of the code BC is taken. The results of the first and second readings are then compared in order to ascertain that the finished tyre laid on the support 110 is actually the one from which the code BC was initially read, and for which the information including size, identification code and other information (which will be described below) have been retrieved.

Preferably, the first reading of the code BC is taken manually by an operator, through a manually controlled device, and the second reading of the code BC is taken by a reading device RD belonging to the apparatus 1. For example, the device RD may be mounted in proximity to the support 110.

According to the code BC read on the sidewall of the finished tyre FT, comparison data CD are also retrieved from the database.

In said database DB, in particular, the mould drawing MD used for making the finished tyre FT is selected, preferably along with supplementary data SD.

The mould drawing MD (schematically represented in FIG. 1) includes some symbols A1-A3 which are expected to appear identically on the finished tyre FT.

For example, a symbol A1 may consist of a text portion TXT, while the symbols A2-A3 are logos/pictures.

Each symbol A1-A3 is situated in a respective portion PA1-PA3 of the mould drawing MD.

The mould drawing MD also includes first and second indications I1, I2.

The first and second indications I1, I2 are situated in respective portions PA4, PA5 of the mould drawing MD.

The first indication I1 is representative of a symbol A4 that is absent in the mould drawing MD, but expected on the finished tyre FT.

Preferably, the first indication I1 concerns a text symbol, representative of at least one of: production time reference of the finished tyre FT; serial number of the mould used; version of a profile of sidewall plates belonging to said mould.

The Applicant observes that, for simplicity, reference is made in the present description to just one first indication I1. Two or more indications may however be present, representing text portions not included in the mould drawing MD, but expected on the finished tyre FT. The considerations that follow in regard to the first indication I1 shall also apply to any further indications of the same nature.

The second indication I2 is representative of a symbol A5 consisting of a QR code that is absent in said mould drawing MD, but expected on the finished tyre FT.

From a practical viewpoint, the first and second indications I1, I2 may be provided as a predefined combination of characters (e.g. a series of "X"s) which, as it is detected, permits understanding that it is a reference to data that are not directly included in the mould drawing MD. As will become clearer below, such data not included in the mould drawing MD are the above-mentioned supplementary data SD.

The supplementary data SD may comprise one or more of: production time reference of the finished tyre FT; serial number of the mould used; information code (in particular, a QR code, preferably expressed in decoded format, i.e. not in graphic format, but as one or more alphanumeric strings corresponding to the encoded graphic version of the QR code); version of a profile of sidewall plates belonging to said mould.

The supplementary data SD are stored in the database DB, in association with the code BC of the tyre to which they refer.

The mould drawing MD comprises also a plurality of zones ZA1-ZA5 where no symbols are present, the corresponding surface of the mould being substantially smooth.

Referring back to the finished tyre FT, preferably, after the first and second readings of the code BC have been taken (and after it has been verified that such two readings are coherent), the detection device DD are activated.

Thanks to the detections made by the detection devices DD, while the finished tyre FT is rotated about its own axis of rotation (block 1030 in FIG. 7), the processing unit PU obtains a graphic representation GR of the finished tyre FT, particularly of a sidewall thereof (block 1040 in FIG. 7).

In more detail, one or more cameras included in the detection devices DD acquire, in succession, images representative of the sidewall of the finished tyre FT; one or more laser devices permit, by emitting a laser radiation and detecting the corresponding radiation reflected by the sidewall of the finished tyre FT, a further definition of the shape of the sidewall and of the symbols formed thereon.

Preferably, the graphic representation GR thus obtained is a three-dimensional graphic representation, particularly a high-resolution one; it is represented as a two-dimensional image, wherein the third dimension is represented as a colour or a shade of grey: points that are closer to the detection devices DD are represented in a clearer shade, whereas farther points are represented in a darker shade.

FIGS. 6*a*-6*b* show, by way of example, two portions of a graphic representation GR. It can be noticed that raised symbols are represented in a clearer shade of grey compared with the background.

FIG. 2 shows the graphic representation GR in a schematized manner.

The graphic representation GR includes a plurality of symbols B1-B5, each one positioned in a respective portion PB1-PB5 of the graphic representation GR.

Advantageously, in order to obtain the graphic representation GR, the processing unit PU applies one or more compensation algorithms so as to compensate for any (local or extended) deformations of the finished tyre FT. It is in fact necessary to consider that the finished tyre FT is not assembled to the rim and, obviously, not inflated. As a consequence, the finished tyre FT may not have a perfectly regular shape, and this might lead to creating a graphic representation not accurately reproducing the symbols that are actually present on the sidewall of the finished tyre FT. By way of example, the compensation technique described in international patent application WO 2015/097635 A1 by the present Applicant may be used.

Ideally, the symbols B1-B3 of the graphic representation GR should turn out to be identical to, and in the very same position as, the symbols A1-A3 in the mould drawing MD, and the symbols B4-B5 should turn out to be identical to the supplementary data SD corresponding to the indications I1, I2 and in a position exactly corresponding to the indications I1, I2.

In order to verify if the finished tyre FT, represented by the graphic representation GR, is identical or sufficiently similar to the desired result (represented by the mould drawing MD and the supplementary data SD), the processing unit PU is configured for making a number of comparisons. FIG. 8 shows a block diagram of some operations that are carried out for this purpose.

The processing unit PU is configured for acquiring comparison data CD, preferably as a function of the code BC read on the sidewall of the finished tyre FT (blocks 2000, 2010 in FIG. 8).

The comparison data CD comprise the mould drawing MD. More preferably, the comparison data CD comprise also the supplementary data SD.

The comparison data CD are preferably stored in the database DB, which the processing unit PU can access in order to acquire them.

Both the mould drawing MD and the supplementary data SD are stored in the database DB in association with the code BC, so that they can be identified/selected on the basis of such code BC.

Preferably, prior to comparing the symbols A1-A5 defined by the comparison data CD with the symbols B1-B5 included in the graphic representation GR, the processing unit PU executes an alignment operation (block 2020 in FIG. 8) aimed at defining a match between points/positions in the mould drawing MD and points/positions in the graphic representation GR.

In one embodiment, the alignment process can be carried out using an artificial intelligence tool.

For simplicity's sake, in the following explanation the expression "terms of comparison" will be used to generally indicate the graphic representation GR and the mould drawing MD.

The processing unit PU identifies an element, e.g. a symbol (called "predefined symbol") in one of the terms of comparison (first term of comparison). The processing unit PU then identifies the predefined symbol in the other term of comparison (second term of comparison).

In one embodiment, the first term of comparison is the mould drawing MD, and the second term of comparison is the graphic representation GR of the finished tyre FT.

In one embodiment, the first term of comparison is the graphic representation GR of the finished tyre FT, and the second term of comparison is the mould drawing MD.

The following will describe the alignment process with reference to the first one of such two embodiments. Note that the same considerations also apply to the second one of such two embodiments.

The predefined symbol used for the alignment operation may be, for example, the company name/logo, which is normally present on all tyres, always in the same format. It is nevertheless possible to select a different symbol.

The processing unit PU then operates as follows:

- identifying, in the mould drawing MD, the predefined symbol;
- defining, in the mould drawing MD, a first reference REF-A as a function of the position of the predefined symbol in the mould drawing MD;
- searching, in the graphic representation GR of the finished tyre FT, for a symbol corresponding to the predefined symbol;
- defining, in the graphic representation GR of the finished tyre FT, a second reference REF-B on the basis of the position, in the graphic representation GR, of the symbol corresponding to the predefined symbol.

In FIGS. 1-2, the predefined symbol in the mould drawing MD is the symbol A2, and the corresponding symbol in the graphic representation is the symbol B2.

In the example shown in FIGS. 1-2, the match between the first reference REF-A and the second reference REF-B is given by the fact that the two references are respectively identified by the leftmost end of the predefined symbol A2 in the mould drawing MD and by the leftmost end of the corresponding symbol B2 in the graphic representation GR.

The first reference REF-A is advantageously used for defining, in the mould drawing MD, the above-mentioned portions PA1-PA5, each one having a specific position relative to the first reference REF-A.

The second reference REF-B is advantageously used for defining, in the graphic representation GR, the above-mentioned portions PB1-PB5, each one having a specific position relative to the second reference REF-B.

The position of each portion PA1-PA5 relative to the first reference REF-A corresponds to the position of the respective portion PB1-PB5 relative to the second reference REF-B.

Preferably, each portion PA1-PA5 of the mould drawing MD has substantially the same size as the corresponding portion PB1-PB5 of the graphic representation GR.

In short, if we imagine to superimpose the graphic representation GR on the mould drawing MD so that the second reference REF-B coincides with the first reference REF-A, we will obtain that each portion PB1-PB5 of the graphic representation GR will exactly overlap the respective portion PA1-PA5 of the mould drawing MD.

Preferably, the sizes of the portions PA1-PA5, PB1-PB5 (e.g. expressed as circumferentially measured width) can be defined as a function of the presence and dimensions of the symbols and/or indications contained in such portions. For example, the algorithm employed by the processing unit PU for defining such portions may prevent a symbol or an indication from being contained partly in one portion and partly in an adjacent portion.

In order to make the comparison between the symbols B1-B5 included in the graphic representation GR and the symbols A1-A5 defined by the comparison data CD, the processing unit PU identifies the symbols A1-A3 in the mould drawing MD (block 2030 in FIG. 8). For each one of such symbols, a corresponding symbol B1-B3 is searched for and identified in the graphic representation GR (block 2040 in FIG. 8).

In particular, once the portion PA1-PA3 in which each symbol A1-A3 is situated in the mould drawing MD has been identified, the corresponding symbol B1-B3 is searched for (and possibly identified) in the corresponding portion PB1-PB3 of the graphic representation GR.

After the corresponding symbols B1-B3 have been located, the processing unit PU makes a comparison between each symbol A1-A3 included in the mould drawing MD and the corresponding symbol B1-B3 included in the graphic representation GR (block 2050 in FIG. 8).

This comparison preferably concerns both the shape and the position of the symbol.

In particular, the processing unit PU verifies if each symbol B1-B3 in the graphic representation GR is substantially identical, or anyway very similar, to the corresponding symbol A1-A3 in the mould drawing MD. From a practical viewpoint, such shape identity can be imagined as the two symbols being substantially superimposable on each other.

As far as the position of the symbols is concerned, in addition to determining (as explained above) that the two symbols are located in mutually corresponding portions, the processing unit PU also accurately verifies that the position of the both symbols is exactly the same as, or anyway sufficiently similar to, that of the respective references REF-A, REF-B.

Preferably, the above-described comparison is carried out on at least those symbols which—in the mould drawing MD—are identified as graphic elements, as opposed to text portions. In one embodiment, it is nevertheless possible to make such comparison also on the text portions included in the mould drawing MD.

In this regard, the Applicant observes that, in CAD drawings, text portions and elements having a greater graphic characterization are distinguished in a clear and evident manner: text portions consist of "text boxes", created by entering characters by means of a keyboard (or equivalent text input means), whereas elements having a greater graphic characterization consist of images (e.g. in .jpg, .bmp, etc. format) or shapes created using computer aided design tools.

As far as text portions are concerned, it is possible to conduct a further verification by subjecting the graphic representation GR to OCR scanning.

In more detail, let use assume that, for example, the symbol A1 included in the mould drawing MD comprises a text portion TXT.

The processing unit PU locates the symbol B1, included in the graphic representation GR, in the position corresponding to that of the symbol A1 in the mould drawing MD; on such symbol B1, the processing unit PU executes an OCR (Optical Character Recognition) operation, thereby obtaining an alphanumeric result.

A comparison is then made between the text portion TXT and the alphanumeric result obtained by OCR scanning.

In the above description, reference has been made to symbols A1-A3 included in the mould drawing MD. However, as aforesaid, the mould drawing MD also includes indications I1, I2, which are not symbols but permit identifying/defining symbols A4, A5 that should be present on the sidewall of the finished tyre FT.

For example, the first indication I1 is representative of a symbol A4 that is absent in the mould drawing MD, but expected on the finished tyre FT.

The processing unit PU retrieves, among the supplementary data SD, text data representative of the symbol A4, i.e. the symbol indirectly represented by the first indication I1.

As aforesaid, the first indication I1 (as well as the second indication I2) may consist, in practice, of a predefined sequence of characters that makes it possible to understand that it is not a symbol and to retrieve the corresponding supplementary data SD.

In particular, the processing unit PU is configured for locating, in the mould drawing MD, the portion PA4 where the first indication I1 is situated. Subsequently, the corresponding portion PB4 is located in the graphic representation GR. The processing unit PU detects the symbol B4 included in such portion and consisting of text data, and then subjects the symbol B4 to OCR scanning.

Finally, a comparison is made between the text data that describe the symbol A4, extracted from the supplementary data SD, and the text data of the symbol B4, obtained by OCR scanning.

Preferably, the second indication I2 is representative of a symbol A5 consisting of a QR code. Such QR code is absent in the mould drawing MD, but expected on the finished tyre FT.

In order to verify that such QR code is correctly present on the sidewall of the finished tyre FT, the processing unit PU retrieves from the supplementary data SD, based on the second indication I2, the data represented by said QR code.

The processing unit PU then locates, in the mould drawing MD, the portion A5 where the second indication I2 is situated, and locates the corresponding portion B5 in the graphic representation GR, where the QR code is expected to be.

A detection of a QR code (if present) is then made in such portion B5 of the graphic representation GR. The processing unit PU decodes such detected QR code, thereby obtaining a corresponding alphanumeric string.

Finally, a comparison is made between the data represented by the QR code found in the supplementary data SD and the corresponding alphanumeric string obtained by decoding the QR code detected in the graphic representation GR.

FIG. 9 schematically shows the steps carried out in relation to the indications I1, I2: block 3000 represents the location of the indications I1, I2 in the mould drawing MD; block 3010 represents the identification of the corresponding supplementary data SD, and block 3020 represents the definition of the corresponding expected symbols A4, A5 (text data for symbol A4, and QR code for symbol A5); block 3030 represents the location of the corresponding symbols B4, B5 included in the graphic representation GR; block 3040 represents the comparison between the symbols A4, A5 defined by the supplementary data SD, according to the indications I1, I2, and the corresponding symbols B4, B5 detected in the graphic representation GR.

In one embodiment, the processing unit PU is configured for verifying if the graphic representation GR includes any further items other than the symbols A1-A5—i.e. if there is anything other than the symbols included in the mould drawing MD or defined by the supplementary data SD.

For this purpose, the processing unit locates zones ZA1-ZA5 of the mould drawing MD where no symbols A1-A3 or indications I1-I2 of symbols A4-A5 are present, and verifies if there are any symbols or other patterns printed on the sidewall of the finished tyre FT in corresponding zones ZB1-ZB5 of the graphic representation GR.

As a function of the comparison between the symbols A1-A5 defined by the comparison data CD (which, as aforesaid, comprise the mould drawing MD and also, preferably, the supplementary data SD) and the symbols B1-B5 included in the graphic representation GR, the processing unit PU generates a notification signal NS representative of the result of such comparison.

Preferably, the notification signal NS also includes information about the comparison between the zones ZA1-ZA5 of the mould drawing MD and the corresponding zones ZB1-ZB5 of the graphic representation GR.

The notification signal NS may contain concise information about the whole finished tyre FT, such as good/bad.

In addition or as an alternative, the notification signal NS may contain the detailed results of the comparisons made for each symbol/indication. Such results may be represented, for example, in percentage terms, wherein 100% indicates a perfect similarity between the symbol included in the graphic representation GR and the corresponding symbol defined by the comparison data CD.

In one embodiment, one or more thresholds are defined in order to categorize the comparison results. For example, one threshold may be set to 97%, so that any comparison giving a result equal to or above such threshold will be considered as positive ("OK"), while any comparison giving a result below such threshold will be considered as negative ("NOK").

A more complex structure may also be envisaged, with a greater number of thresholds, e.g. in order to identify any results below 97%-100% that are nonetheless still acceptable from a commercial viewpoint (e.g. 93%-96%), while any other comparison results will be considered as negative.

From a practical viewpoint, the information contained in the notification signal NS may, in addition to being stored for management purposes, be made available to an operator on a display, so that the operator can view the results of the verifications and make decisions accordingly. For example, the detailed list of the checks to be made on the individual symbols may be presented in table form, wherein positive results are highlighted in a given colour (e.g. green) and negative results are highlighted in a different colour (e.g. red).

The ability of the notification signal NS to carry this information content comes from the fact that the algorithms used by the processing unit PU for comparing the various symbols can preferably provide a result consisting of a measurement of the identity/similarity between the compared elements, as opposed to just providing a basic indication like either "equal" or "different". By way of example, the Applicant observes that it is possible to use a software tool such as the product called "Halcon", currently available from MVTec Software GmbH and presented at the following address: https://www.mvtec.com/products/halcon (last access: 15 Dec. 2021).

In one embodiment, the algorithms used for the comparison operations and/or for the OCR operations may employ artificial intelligence tools.

In one embodiment, the finished tyre FT is the first finished tyre obtained from the mould (represented in the mould drawing MD) after such mould has been installed in a respective curing apparatus. Thus, the result provided by the notification signal NS will make it possible to decide whether tyre production can continue with such mould or an intervention is needed.

When the detections necessary for generating the graphic representation GR of a first sidewall of the finished tyre FT have been completed, the latter is turned over on the support 110 to expose its second sidewall to the detection devices DD, so that a respective graphic representation can be generated and also the symbols on the second sidewall can be compared.

The Applicant also observes that, in some particular circumstances wherein a modification has been made to just one side of the mould, e.g. when the plate indicating the production week and year has been changed, the method according to the invention may be applied to just one sidewall of the finished tyre FT.

In this description and in the annexed drawings, reference has been made to three symbols A1-A3 and two indications I1, I2 in the mould drawing MD and, correspondingly, five symbols B1-B5 in the graphic representation GR. The Applicant observes that this is only an example, since the number of symbols/indications may differ. As a matter of fact, such number is typically higher in real applications.

In addition to the above, the Applicant observes that checks like those described above, carried out repeatedly over time (whether only on the first moulded tyre or also on other tyres moulded by the same mould), make it possible to identify any defects of a mould; it will thus be possible to take action when the defects are not yet so marked as to make the manufactured tyres unusable (i.e. to cause them to be rejected), by properly servicing the mould and bringing it back into a perfectly fit condition.

The Applicant also observes that the processing unit PU is equipped with one or more input/output interfaces, which are used, for example, for acquiring the detections made by the detection devices DD, the code BC of the finished tyre FT, the comparison data CD, and for outputting the notification signal NS. The processing unit PU can be implemented as one or more processors, programmed for executing the above-described operations. The processing unit PU may be equipped with a non-volatile memory that stores a software program comprising computer-readable instructions for obtaining the notification signal NS as a function of the comparison between the graphic representation GR of the finished tyre FT and the comparison data CD. The at least one processor included in the processing unit PU is used in order to execute said software program for obtaining the graphic representation GR and generating the notification signal NS representative of the results of the comparisons made. The processing unit PU may be connected to a visualization device, e.g. a display, which may allow an operator to view the content of the notification signal NS and optionally other data generated/processed by the processing unit PU.

The processing unit PU may be positioned either on site, i.e. in the vicinity of the checking device 100, or in a geographical remote position; in this latter case, the processing unit PU is suitably connected to the detection device DD, the database DB and the reading device RD to ensure the above-described data communication.

The processing unit PU may also be implemented as two or more physically distinct modules, e.g. each one dedicated to different functions/operations. The two or more modules may be physically located in the same place, or they may be positioned in geographical distinct locations and provided with a suitable connection in order to be able to communicate with each other whenever necessary.

As far as the database DB is concerned, it may consist of/comprise/be a part of the computer systems of the plant where the apparatus 1 operates. The database DB may be composed of a plurality of storage devices, which store the data required for the operation of the plant. Such storage devices may be positioned locally in proximity to the checking device 100, e.g. within the same plant, or may be positioned in geographically remote locations. In any case, the processing unit PU is provided with suitable connectivity to be able to acquire the necessary data from the database DB in accordance with the above description.

The invention claimed is:

1. A method for checking tyres, comprising:

arranging, at a checking device, a finished tyre that was moulded and cured in a mould;

providing comparison data comprising a mould drawing of said mould;

activating one or more detection devices to obtain a graphic representation of at least one sidewall of said finished tyre;

activating a processing unit to perform a comparison between i) symbols included in said graphic representation and ii) symbols defined by said comparison data; and generating, by said processing unit, a notification signal representative of a result of said comparison, wherein said comparison data comprise supplementary data, wherein performing a comparison between symbols in said graphic representation and symbols defined by said comparison data comprises:

identifying, in the mould drawing, a first indication representative of a symbol that is absent in said mould drawing, but expected on the finished tyre; and locating, in said supplementary data, text data representative of said symbol that is absent in said mould drawing, but expected on the finished tyre, corresponding to said first indication.

2. The method according to claim 1, wherein said finished tyre is the first finished tyre obtained from said mould after installation of said mould in a curing apparatus.

3. The method according to claim 1, wherein providing said comparison data comprises:

detecting a code on said finished tyre; and selecting said comparison data in a database on the basis of said code.

4. The method according to claim 3, wherein detecting said code comprises:

performing a first reading of said code prior to arranging said finished tyre at said checking device;

performing a second reading of said code after said finished tyre has been arranged at said checking device; and comparing a result of said first reading with a result of said second reading.

5. The method according to claim 1, wherein, in order to obtain said graphic representation, one or more compensation algorithms are applied to compensate for deformations of said finished tyre.

6. The method according to claim 1, wherein said comparison between symbols included in said graphic representation and symbols defined by said comparison data comprises:

identifying symbols in the mould drawing;

searching for and identifying corresponding symbols in the graphic representation; and performing a comparison between each symbol in the mould drawing and the corresponding symbol in the graphic representation.

7. The method according to claim 6, wherein said comparison between each symbol in the mould drawing and the corresponding symbol in the graphic representation comprises at least one of:

a comparison between a position of each symbol in the mould drawing and a position of the corresponding symbol in the graphic representation;

a comparison between a shape of each symbol in the mould drawing and a shape of the corresponding symbol in the graphic representation.

8. The method according to claim 6, wherein at least one symbol in the mould drawing comprises a text portion, wherein the comparison between said at least one symbol comprising a text portion and the corresponding symbol in the graphic representation comprises:

selecting the text portion in the mould drawing;

executing an optical character recognition (OCR) operation on the corresponding symbol in the graphic representation to obtain an alphanumeric result; and performing a comparison between the text portion in the mould drawing and said alphanumeric result.

9. The method according to claim 1, wherein said supplementary data comprise one or more parameters selected from the group consisting of: tyre production time reference; mould serial number; information code; and version of a profile of sidewall plates belonging to said mould.

10. The method according to claim 1, wherein performing the comparison between symbols in said graphic representation and symbols defined by said comparison data comprises performing a comparison between said supplementary data and symbols in the graphic representation, said comparison between said supplementary data and symbols in the graphic representation comprises:

locating, in said mould drawing, a first portion where said first indication is situated;

subjecting a second portion of said graphic representation, corresponding to the first portion of said mould drawing, to OCR scanning in order to detect a symbol consisting of text data; and performing a comparison, by OCR scanning, between the text data describing the symbol that is absent in the mould drawing, but expected on the finished tyre, and the text data of the symbol detected in the graphic representation.

11. The method according to claim 10, wherein said comparison between said supplementary data and symbols in the graphic representation comprises:

locating, in said mould drawing, a second indication, representative of a symbol consisting of a QR code that is absent in said mould drawing, but expected on the finished tyre;

identifying, in the mould drawing, a third portion where said second indication is situated;

locating, among said supplementary data, data represented by said QR code;

detecting, in said graphic representation, in a fourth portion corresponding to the third portion of the mould drawing, a QR code;

decoding said detected QR code to obtain a corresponding alphanumeric string; and performing a comparison between the data represented by said QR code, located in said supplementary data, and said corresponding alphanumeric string.

12. The method according to claim 1, wherein performing the comparison between symbols in the graphic representation and symbols defined by the comparison data comprises verifying if the graphic representation includes any further symbols other than the symbols defined by the comparison data.

13. The method according to claim 12, wherein said verification comprises:

locating zones of the mould drawing where no symbols or indications of symbols are present; and verifying if there are any symbols in corresponding zones of the graphic representation.

* * * * *